US00RE38285E

(19) United States
(12) Reissued Patent
Susa et al.

(10) Patent Number: US RE38,285 E
(45) Date of Reissued Patent: Oct. 28, 2003

(54) TREATING SOLUTION AND TREATING METHOD FOR FORMING PROTECTIVE COATING FILMS ON METALS

(75) Inventors: Hideo Susa, Tokyo (JP); Masaaki Yamamuro, Tokyo (JP); Mitsuomi Katori, Tokyo (JP)

(73) Assignee: Nihon Hyomen Kagaku Kabushiki Kaisha, Tokyo (JP)

(21) Appl. No.: 10/137,593

(22) Filed: May 2, 2002

Related U.S. Patent Documents

Reissue of:
(64) Patent No.: 6,096,140
Issued: Aug. 1, 2000
Appl. No.: 08/916,644
Filed: Aug. 22, 1997

(30) Foreign Application Priority Data

May 9, 1909 (JP) ..... 9-134526
Oct. 30, 1996 (JP) ..... 8-303562

(51) Int. Cl.[7] ..... C23C 22/07
(52) U.S. Cl. ..... 148/253; 148/261; 148/258
(58) Field of Search ..... 148/253, 277, 148/261, 258

(56) References Cited

U.S. PATENT DOCUMENTS

| | | | | |
|---|---|---|---|---|
| 2,599,878 | A | 6/1952 | Von Liedtke | 92/66 |
| 2,839,439 | A | 6/1958 | Stapleton | 148/6.15 |
| 2,933,422 | A | 4/1960 | Mason | 148/6.24 |
| 3,932,198 | A | 1/1976 | Schneider | 148/6.2 |
| 4,149,909 | A | 4/1979 | Hamilton | 148/6.17 |
| 5,393,353 | A | 2/1995 | Bishop | 148/258 |
| 5,393,354 | A | 2/1995 | Bishop | 148/258 |
| 5,407,749 | A | 4/1995 | Bishop | 148/258 |
| 5,415,702 | A | 5/1995 | Bishop et al. | 148/258 |

FOREIGN PATENT DOCUMENTS

| | | |
|---|---|---|
| EP | 0 034 040 A1 | 8/1981 |
| EP | 0 321 059 A1 | 6/1989 |
| EP | 0 403 241 A1 | 12/1990 |
| EP | 0 694 593 A | 1/1996 |
| FR | 1 300 295 A | 12/1962 |
| FR | 2 274 706 | 1/1976 |
| GB | 1461 244 A | 1/1977 |
| GB | 2 059 445 A | 4/1981 |
| GB | 2 097 024 A | 10/1982 |
| JP | 6129981 | 12/1986 |
| JP | 62070583 | 4/1987 |
| JP | 62180081 | 8/1987 |
| SU | 885353 | 12/1981 |
| SU | 1404550 | 6/1988 |
| SU | 1781316 | 12/1992 |
| WO | WO 91/04354 | 4/1991 |
| WO | WO 95/04169 | 2/1995 |
| WO | WO 96/07772 | 3/1996 |

OTHER PUBLICATIONS

Clear Chromates: Theory and Practice, Dr. Klaus Peter Klos, Trebus, West Germany, *Products Finishing,* vol. 52., No. 9, pp. 71–78 (1988) (no month data).
*Jitsumu Hyomen Gijutsu* (Practical Surface Technologies), vol. 35, No. 1, pp. 20–25 (1988) (no month data).
Partial European Search Report from EP 99 20 0045 dated Apr. 21, 1999.

*Primary Examiner*—John Sheehan
*Assistant Examiner*—Andrew L. Oltmans
(74) *Attorney, Agent, or Firm*—Marshall, Gerstein & Borun

(57) ABSTRACT

A metallic surface treating solution characterized in that it is an aqueous solution at pH 0.1 to 6.5 comprising a source of at least one selected from the group consisting of Mo, W, V, Nb, Ta, Ti, Zr, Ce, Sr, and trivalent chromium, an oxidizing substance source, and an oxyacid or oxyacid salt of phosphorus or its anhydride, a surface treating method using the treating solution, and metals thereby treated on the surface.

6 Claims, 1 Drawing Sheet

TREATING SOLUTION AND TREATING METHOD FOR FORMING PROTECTIVE COATING FILMS ON METALS

Matter enclosed in heavy brackets [ ] appears in the original patent but forms no part of this reissue specification; matter printed in italics indicates the additions made by reissue.

BACKGROUND OF THE INVENTION

This invention generally relates to a surface treating solution for zinc, copper, nickel, silver, iron, cadmium, aluminum, magnesium, and their alloys, a method of applying surface coatings, and coated metallic materials. The invention specifically relates to a surface treating solution and a treating method for forming protective coating films on zinc- and zinc alloy-coated iron parts, and surface treated metallic materials.

There are various films as protective coating films on zinc, copper, nickel, silver, iron, cadmium, aluminum, magnesium, and their alloys. However, no such film that corresponds to any according to the present invention has been found yet, and this invention provides newly discovered coating films. The most common of corrosion-preventive methods in use for iron articles and parts is coating with zinc or zinc alloy (hereinafter called "galvanizing"). Galvanized iron articles and pins, if used as they are, would readily form a zinc white rust. To avoid this, they are usually provided with a protective coating film over the galvanized surface. Protective coating films that are conventionally used on zinc coat are formed by phosphate and chromate treatments. Chromate treatment is divided into three types; electrolytic, coating, and reaction type chromate treatments. These treatments are applicable not only to zinc but also to aluminum, cadmium, magnesium, and their alloys.

Phosphate treatment is a process, as taught in Patent Application Kokai No. 3-107469, which comprises immersing an object to be coated in a treating solution which consists essentially of zinc ion and phosphate ion as film-forming components and fluoride ion or complex fluoride ion as an etching or film-densifying agent, heated to 40 to 50° C. or up to about 75° C., thereby forming a coating film on the object, water washing, and then drying the coated object. The surface of the coating film thus obtained is very rough with the needle crystals of zinc phosphate piled up. This surface condition helps improve the adhesion of paint and enhance the corrosion resistance of the painted surface, achieving the dual purpose of the film. However, the film before painting is seriously short of rust-inhibiting capacity (corrosion resistance). Moreover, the surface as treated looks dull gray to grayish white and lacks ornamental effect. Since the treated surface is not aesthetically attractive, it is not suited for articles that are partly or wholly unpainted. Phosphate films essentially contain fluoride ion or complex fluoride ion without which they cannot be formed, but either ion is strongly corrosive and comes in the list of substances under emission control. High treating temperature, and extra equipment and cost for heating are additional disadvantages.

On the other hand, chromate film before painting is superior to phosphate film in corrosion resistance. However, chromate treatment has recently caused growing concern, because of the adverse effects upon the human beings and the environments of the treating solution that necessarily uses poisonous hexavalent chromium and also because of the chromium itself that dissolves out of the treated articles.

This is an insurmountable problem since chromate film essentially depends on the hexavalent chromium for its corrosion resistance. Another knotty problem that is always associated with electrolytic chromate treatment in which a chromate film is formed by electrolysis is the problem of throwing power, especially with workpieces of components naturally of far intricate configurations than steel sheets. In addition, the mist of chromic acid that results from the electrolysis can cause more serious environmental pollution than other known processes. Coating type chromate treatment comprises applying an acidic aqueous solution essentially containing chromic acid to a metallic surface and without water washing, drying the coated surface with heat. Like electrolytic chromating, the coating type is not suited for workpieces of complex configurations. Moreover, the process has its limitation on the uniformity of coating film thickness. This combines with the omission of water washing to make the treated surface as uneven as with the phosphate film. The coated film, therefore, is unable to satisfy the users' aesthetic requirements when used alone and, like the phosphate film, it is commonly employed as a mere undercoat. Reaction type chromate treatment, by contrast, is often adopted as finish coating as well as undercoating because of the uniform appearance and stable corrosion resistance of the coating film. It has the unsettled pollution problem of hexavalent chromium, however.

The present invention has for its object to form protective coating films which combines a uniform, good appearance and corrosion resistance on the surfaces of zinc, copper nickel, silver, iron, cadmium, aluminum, magnesium, and their alloys, without using noxious hexavalent chromium or strongly corrosive fluorine compounds. A particularly important object is to provide protective coating films or galvanized iron articles other than steel sheets, for which coating type treatment on an industrial scale has hitherto been practically difficult.

SUMMARY OF THE INVENTION

With a view to solve the problems of the prior art, the present inventors have concentrated their efforts and have now successfully obtained coating films that apparently do not belong to the ordinary category of phosphate films or chromate films. It has now been found possible to produce coating films having beautiful, bright appearance and outstanding corrosion resistance, without using hexavalent chromium, by a method which comprises forming a film or a metallic surface either by immersion in or electrolysis with a treating solution characterized in that it is an aqueous solution at pH 0.1 to 6.5 comprising a source of at least one selected from the group consisting of Mo, W, V, Zr, Sr, Nb, Ta, Ti, Ce, and trivalent chromium, an oxyacid or oxyacid salt of phosphorus or an anhydride thereof, and an oxidizing substance source, water washing, and drying. It has also been found that protective coating films with enhanced corrosion resistance can be obtained by water washing a film formed by immersion or electrolysis and, without drying bringing the washed film into contact with a resin or inorganic colloid. The coating films obtained in accordance with the invention have been found to exhibit great high temperature corrosion resistance, thus solving a problem common with ordinary chromate films; weakened corrosion resistance upon heat treatment. It is another feature of the inventive method that, when the treatment is performed by immersion, an existing equipment for reaction type chromate treatment can be utilized to an economic advantage.

DETAILED DESCRIPTION OF THE INVENTION

Figure 1:
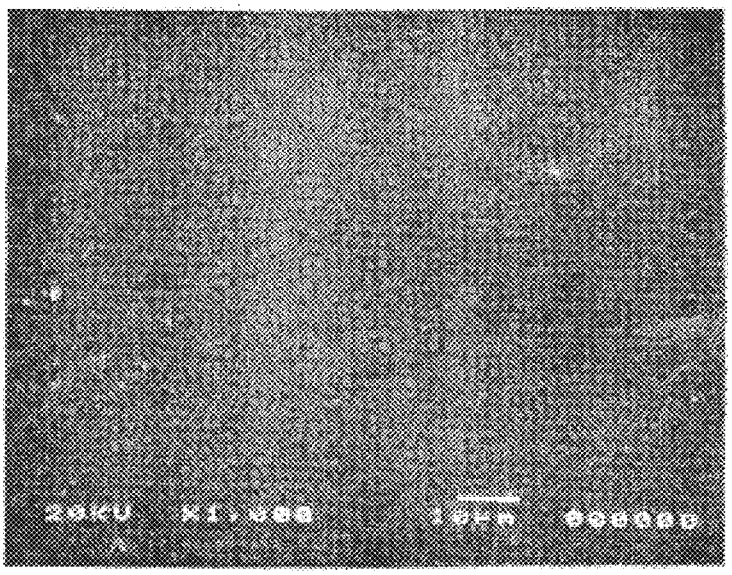
FIG. 1 is an electron micrograph showing the surface texture of a coating film formed in Example 1 of the present invention.

The present invention will now be described in detail. The treating solution according to the invention is an aqueous solution at pH 0.1 to 6.5 comprising a source of a metallic cation, oxymetallic anion or the like of Mo, W, V, Nb, Ta, Ti, Zr, Sr, Ce, or trivalent chromium, oxidizing substance [selected from the group consisting of peroxide, hydrochloric acid, hydrobromic acid, nitric acid, and salts thereof] source, an oxyacid or oxyacid salt of phosphorus or its anhydride, and an oxidizing substance source. Although the exact behavior of each component is unknown, a source of any of various metals such as molybdate ion, tungstate ion, vanadate ion, niobate ion, tantalate ion, or trivalent chromium ion and an oxyacid or oxyacid salt of phosphorus or its anhydride are presumed to be components that form the skeleton of a coating film. An oxidizing substance presumably inhibits the ionization in a solution of the oxyacid or oxyacid salt of phosphorus or its anhydride and ensures the stability of the solution while, at the same time, properly etching the metal and promoting smooth film formation. Suitable oxidizing substance sources include peroxides, chloric acid, bromic acid, nitric acid, and salts thereof.

In the case of alloy substrates that have particularly strong possibilities of hampering uniform coating film formation, the absence of an oxidizing substance often makes the film unable to exhibit satisfactory performance. This can cause phenomena such as the inability of forming a thick film due to difficulty of etching or of forming a uniform appearance owing to uneven etching and the consequent failure of obtaining a levelled film surface, and localized chemical synthesis for film formation in certain areas and no film formation in the remainder. The presence of an oxidizing substance that controls these phenomena varies in performance, five to more than ten times, depending on its proportion to the composition of the treating solution, and therefore a proper amount of such a substance must be used.

The total amount of the metal source, such as molybdate ion, tungstate ion, vanadate ion, niobate ion, tantalate ion, or trivalent chromium ion, ranges from 0.2 to 300 g/l, preferably from 0.5 to 80 g/l. If the amount is less than the range, a good film is difficult or impossible to obtain. If any, a too thin film is formed to attain desired performance. If the amount is more than the range, marred film appearance and brightness and/or a material economic loss due to excessive dipping out can result. The source is not specially limited, while ammonium vanadate, sodium tungstate, chromium acetate, and chromium nitrate are cited as examples.

The amount of the oxyacid or oxyacid salt of phosphorus or its anhydride to be contained should be from 0.2 to 200 g/l, preferably from 3 to 90 g/l. If the amount is below the range, it is difficult or impossible to obtain a good film, or a too thin film is formed to attain desired performance. If the amount is over the range, the film appearance and brightness are marred and/or the economic loss due to excessive dipping out can increase materially.

As for an oxyacid of phosphorus, not only orthophosphoric acid but also hypophosphorous, pyrophosphoric, tripolyphosphoric, and perphosphoric acids and the like can be used. If such an oxyacid is used in the form of a metallic salt, both a metal and an oxidizing substance can be supplied. The amount to be contained is between 0.2 and 400 g/l, preferably between 2 and 100 g/l. An insufficient amount would make the resulting solution or the film-forming rate instable, but an excessive amount would cause much economic loss due to wasteful dipping out. It would sometimes happen in either case that no coating film is formed.

A pH from 0.1 to 6.5 is desired, a narrower range from 1.0 to 4.0 being preferred. If the pH is too low a uniform film is difficult to obtain, but if it is too high, the corrosion resistance tends to decrease to some extent. Chemicals to be used for pH adjustment are not specially limited, usually nitric or sulfuric acid or the like being used when the pH is too high or an alkali such as ammonia or sodium hydroxide being added when it is too low.

There is no special limitation to the treatment conditions for the formation of coating film by immersion. The treatment may be conducted under a broad range of conditions, e.g., the conditions for ordinary reaction type chromate treatment (bath temperature=20–30° C.; treating time=20–60 sec.; with stirring) or such conditions that treating time=250 sec., without stirring. The conditions for film formation by electrolysis are: current density=up to 30 $A/dm^2$, preferably 0.5–3 $A/dm^2$; duration of current flow=1–1200 sec., preferably 30–180 sec. Even with a lower current density a film is formed, but under the invention the film formation not necessarily depends on electrolysis, and whether a film has been formed by electrolysis or by reaction is hardly discernible. Hence it is impossible to set the lower limit to the current density. When the density is too high, a surface defect known as "burn" or "scorch" develops in the portion subjected to the excessive current density. When the treating time is too short, a film is not formed or, if any, the film is too thin and inferior in corrosion resistance. When the treating time is too long, a dull surface defect sometimes results. Also, the excessive treatment seriously reduces the productivity.

After a coating film has been formed in the manner described above, the film is washed with water. The washing removes surplus matter to provide a uniform surface. Unlike phosphate film and coated chromate film, the film according to the invention has a uniform, bright appearance. Mere drying after the water washing affords the film the appearance and corrosion resistance that satisfy user requirements. Where higher corrosion resistance is a necessity, the film formed by the treatment of the invention may be painted or additionally coated as desired. Conventionally, chromate treatment or phosphate film treatment has been used to form a prime coat for painting. Either treatment ends with drying as the final step. If the surface yet to be dried is painted or otherwise treated, a sound composite film will not result. Under the invention, by contrast, it has been found possible to paint or otherwise coat the film formed by immersion or electrolysis and water washed, without being dried up. This is remarkably effective for the improvement in productivity, because, for one thing, it eliminates the expenses and labor required for the prime coat line (drying step) and for the conveyance of workpieces between painting and coating lines that are otherwise required for conventional processes and, for the other, there is no need of waiting for the temperature drop of the treated surface that has been made hot by drying.

The treating solution may further contain one or two or more substances chosen from among alkaline earth metals, inorganic colloids, silane coupling agents, and organic carboxylic acids.

Usable as inorganic colloids are silica sol, alumina sol, titania sol, zirconia sol, and the like, and as silane coupling agents are vinyltriethoxysilane, γg/l y-methacryloxypropyltrimethoxysilane, and the like.

Although it is rather unthinkable that an alkaline earth metal should precipitate in a coating film, the fact that its addition improves the corrosion resistance implies its effectiveness in densifying the film structure.

The addition of an inorganic colloid, silane coupling agent and the like is not always warranted for cost and other reasons. However, such substances improve the adhesion of the film when it is to be painted or otherwise coated after the treatment of the invention, thus enhancing the corrosion resistance of the finished surface.

The use of an acidic aqueous solution as defined by the invention renders it possible to form an insoluble, solid film over a zinc surface without the aid of noxious hexavalent chromium or highly corrosive fluoride, sometimes using the same equipment, conditions, and method for treatment as the conventional reaction type chromate treatment. This helps solve the health problems including the concern of general users about the escape of hexavalent chromium from ordinarily treated materials, the concern of personnel engaged in the production of chromate and treatment with it and who have been exposed to noxious chromic acid, and the environmental concern about the adverse effects upon wildlife.

The method of the invention is similar to two known methods, chromate treatment and phosphate treatment. However, it does not seem to fall under either category when diversified factors, e.g., the composition of the solution, appearance of the treated surface, anti-corrosion mechanism, and treatment conditions, are taken into consideration. Chromate treatment is a generic term of treatment procedures using an aqueous solution that contains hexavalent chromium, typified by chromic acid. The coating film thereby formed depends on its hexavalent chromium content for its corrosion resistance. Considering this definition, the method of the invention that does not use hexavalent chromium is not a chromate treatment. Since the resulting film does not contain hexavalent chromium, its anti-corrosion mechanism is not dependent upon the hexavalent chromium content in the film, and hence the film is not a chromate one. As a chromate free from hexavalent chromium, trivalent chromate is described in Products Finishing, 52 [9], 71 (1988). The corrosion resistance of the coating film so obtained lasts, in a salt spray test, at most 35 to 40 hours (until 5% zinc white rust is formed). Thus the corrosion resistance of an ordinary trivalent chromate film is only about one quarter to one-fifth that according to the present invention. It is presumed that a trivalent chromate film (film structure or anti-corrosion mechanism), like a conventional hexavalent chromium-containing chromate film, depends on the hexavalent chromium ion concentration in the film for its corrosion resistance, and that is why the film attains such low corrosion resistance. The facts presented above indicate that the film according to this invention differs from conventional chromate films in anti-corrosion mechanism and that the method of the invention is not a chromate treatment.

Phosphate treatment on zinc, as described in above-mentioned Patent Application Kokai No. 3-107469, is a treatment which comprises immersing a workpiece into a treating solution which consists essentially of zinc ion and phosphate ion as film-forming components and fluoride ion or complex fluoride ion as an etching agent (chemical synthesis reaction initiator) or film-densifying agent and heated to 40~50° C. or up to the vicinity of 75° C., thereby forming a coating film on the workpiece, water washing, and drying the coated workpiece. The treatment of the present invention differs from the phosphate treatment in the composition of the solution and in the treating method. In respect of the composition the solution of the invention is utterly different in that it does not require zinc as a film-forming element and fluoride ion or complex fluoride ion as an etching agent. Without these components a phosphate film would not be formed. Also, compared with the phosphate treatment that requires heating to 40~75° C. for film formation, the present invention can carry out the treatment at ordinary temperatures (20~25° C.). Thus the two differ in treatment condition too. A comparison in performance shows that a phosphate film looks grayish white and possesses corrosion resistance of not more than 24 hours before it forms zinc white rust in a salt spray test, whereas the film of the invention is uniform and bright in appearance and exhibits corrosion resistance of more than 120 hours before zinc white rusting starts in a salt spray test. Phosphate coating treatment is usually followed, for added corrosion resistance, by immersion into a dilute aqueous solution of chromic acid, a treatment known as sealing or after-treatment. Even after this additional treatment, the coating film retains corrosion resistance for less than 24 hours, before zinc white rust is formed.

Figure 2:
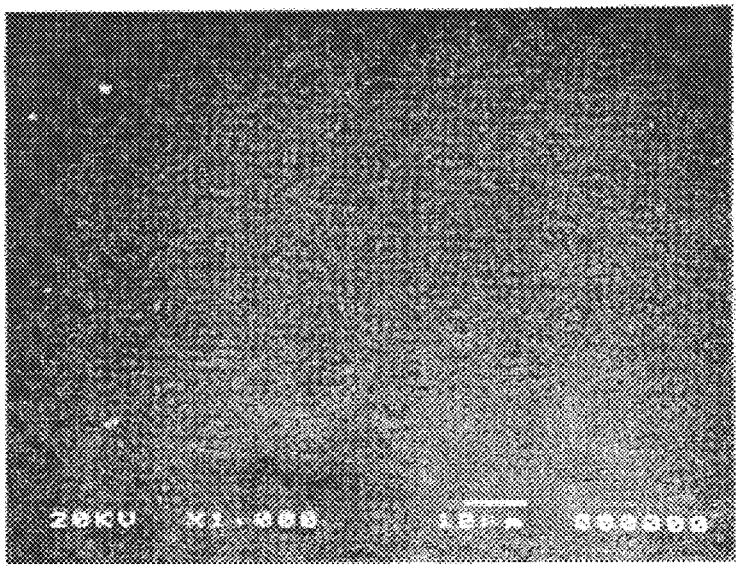
FIG. 2 is an electron micrograph showing the surface texture of a coating film formed in Example 3 of the invention.

It should be clear from electron micrographs of coating films formed in accordance with the invention in FIG. 1 (Example 1) and FIG. 2 (Example 3) that the films are dissimilar to phosphate films. Compared with a phosphate film that is covered completely with needle crystals [JITSUMU HYOMEN GIJUTSU (Practical Surface Technologies), Vol. 35, No. 1, p. 23, Photo 2 (1988)], the films of the invention show no discernible crystal on the surface.

As described above, the treatment according to the present invention is entirely different from conventional phosphate or chromate coating film treatment, when they are compared and studied in diversified aspects including the bath composition, anti-corrosion mechanism, surface configurations, treating conditions, and appearance of the treated surfaces.

The invention is illustrated by the following examples. Tests were conducted with test specimens that had been properly pretreated with degreasing, dip in nitric acid, etc., in the following way. Evaluations of the results were made with regard to the appearance and corrosion resistance and summarized in Table 1.

EXAMPLE 1

A galvanized iron piece (measuring 50×100×1 mm) was coated with a film by immersion for 90 seconds in a treating solution which was an aqueous solution containing 18 g chromium nitrate, 20 g 75% phosphoric acid, and 15 g 67.5% nitric acid, all per liter, and adjusted to pH 1.8 with ammonia. The coated piece was water washed and dried as a test specimen.

Its appearance was visually examined and its corrosion resistance was evaluated from the result of a salt spray test (JIS Z 2371) conducted for 120 hours.

EXAMPLE 2

A test specimen obtained by the procedure of Example 1 was heat treated at 200° C. for one hour to provide a test specimen.

Its appearance was visually inspected and its corrosion resistance was evaluated from the result of a 120-hour salt spray test (JIS Z 2371).

EXAMPLE 3

A galvanized iron piece (50×100×1 mm) was coated with a film by immersion for one minute in a treating solution which was an aqueous solution containing 5 g ammonium tungstate, 15 g chromium nitrate, 25 g 75% phosphoric acid, and 25 g 60% nitric acid, all per liter, and adjusted to pH 2.0 with ammonia. The coated piece was water washed and dried as a test specimen.

Its appearance was visually evaluated and its corrosion resistance from the result of a 120-hour salt spray test (JIS Z 2371).

EXAMPLE 4

A galvanized iron piece (50×100×1 mm) was coated with a film by immersion for two minutes in a treating solution which was an aqueous solution containing 15 g sodium molybdate, 25 g phosphorous acid, and 25 g 60% nitric acid, all per liter, and adjusted to pH 2.0 with ammonia. The coated piece was water washed and dried, and then immersed in and coated with "Kosmer No. 9001" (made by Kansai Paint Co.) as a test specimen.

Its appearance was visually evaluated and its corrosion resistance from the result of a 120-hour salt spray test (JIS Z 2371).

EXAMPLE 5

A galvanized iron piece (50×100×1 mm) was coated with a film by immersion for two minutes in a treating solution of pH 1.0 which contained 15 g chromium nitrate, 2 g ammonium vanadate, 25 g hypophosphorous acid, and 18 g 60% nitric acid, all per liter. The coated piece was water washed and dried, and then immersed in and coated with "Kosmer No. 9001" (of Kansai Paint Co.) as a test specimen.

Its appearance was visually evaluated and its corrosion resistance from the result of a 120-hour salt spray test (JIS Z 2371).

EXAMPLE 6

A galvanized iron piece (50×100×1 mm) was coated with a film by cathodic electrolysis for two minutes at a current density of 1 A/dm$^2$ in a treating solution which was an aqueous solution containing 10 g ammonium vanadate, 20 g chromium nitrate, 25 g 75% phosphoric acid, 20 g 62.5% nitric acid, and 20 g colloidal silica, all per liter, and adjusted to pH 2.0 with ammonia. The coated piece was water washed and, without drying, immersed in and coated with "Kosmer No. 9001" (of Kansai Paint Co.) as a test specimen.

Its appearance was visually evaluated and its corrosion resistance from the result of a 120-hour salt spray test (JIS Z 2371).

EXAMPLE 7

A galvanized iron piece (50×100×1 mm) was coated with a film by cathodic electrolysis for two minutes at a current density of 1 A/dm$^2$ in a treating solution which was an aqueous solution containing 5 g ammonium molybdate, 20 g chromium nitrate, 30 g phosphorous acid, 20 g 62.5% nitric acid, and 20 g colloidal silica, all per liter, and adjusted to pH 2.0 with ammonia. The coated piece was water washed and, without drying, immersed in and coated with "Kosmer No. 9001" (of Kansai Paint Co.) as a test specimen.

Its appearance was visually evaluated and its corrosion resistance from the result of a 120-hour salt spray test (JIS Z 2371).

EXAMPLE 8

A galvanized iron piece (50×100×1 mm) was treated with an aqueous solution of pH 2.5 which contained 8 g 62% nitric acid, 20 g chromium nitrate, and 25 g pyrophosphoric acid, all per liter, at a bath temperature of 30° C. for 80 seconds. The treated piece was immersed in an aqueous solution of colloidal silica to provide a test specimen. The appearance of the specimen was visually examined and its corrosion resistance was evaluated from the result of a 120-hour salt spray test (JIS Z 2371).

EXAMPLE 9

An aluminum alloy (A1050) piece (50×100×1 mm) was coated with a film by immersion for 90 seconds in a treating solution which was an aqueous solution containing 27 g chromium nitrate, 30 g 75% phosphoric acid, and 25 g 67.5% nitric acid, all per liter, and adjusted to pH 1.8 with sodium hydroxide, and water washed and dried as a test specimen.

Its appearance was visually inspected and its corrosion resistance was evaluated from the result of a 120-hour salt spray test (JIS Z 2371).

EXAMPLE 10

A magnesium alloy (MP1) piece (50×100×1 mm) was coated with a film by immersion for two minutes in a treating solution which was an aqueous solution containing 18 g sodium molybdate, 38 g phosphorous acid, and 45 g 60% nitric acid, all per liter, and adjusted to pH 2.0 with sodium hydroxide. The coated piece was water washed, dried, and immersed in and coated with "Kosmer No. 9001" (of Kansai Paint Co.) as a test specimen.

Its appearance was visually evaluated and its corrosion resistance from the result of a 120-hour salt spray test (JIS Z 2371).

EXAMPLE 11

An iron piece coated with zinc containing 0.01% iron (50×100×1 mm) was coated with a film by immersion for 90 seconds in a treating solution which was an aqueous solution containing 18 g chromium nitrate, 20 g 75% phosphoric acid, and 15 g 67.5% nitric acid, all per liter, and adjusted to pH 1.8 with ammonia. The coated piece was water washed and dried as a test specimen.

Its appearance was visually inspected and its corrosion resistance was evaluated from the result of a 120-hour salt spray test (JIS Z 2371).

EXAMPLE 12

An iron piece coated with zinc containing 200 ppm iron (50×100×1 mm) was coated with a film by immersion for one minute in a treating solution which was an aqueous solution containing 5 g ammonium tungstate, 15 g chromium nitrate, 25 g 75% phosphoric acid, and 25 g 60% nitric acid, all per liter, and adjusted to pH 2.0 with ammonia. The coated piece was water washed and dried as a test specimen.

Its appearance was visually evaluated and its corrosion resistance from the result of a 120-hour salt spray test (JIS Z 2371).

EXAMPLE 13

An iron piece coated with zinc containing 5000 ppm iron (50×100×1 mm) was coated with a film by immersion for two minutes in a treating solution which was an aqueous solution containing 15 g sodium molybdate, 6 g chromium sulfate, 25 g phosphorous acid, and 25 g 60% nitric acid, all per liter, and adjusted to pH 2.0 with ammonia. The coated piece was water washed and dried and then immersed in and coated with "Kosmer No. 9001" (of Kansai Paint Co.) to provide a test specimen.

Its appearance was visually evaluated and its corrosion resistance from the result of a 600-hour salt spray test (JIS Z 2371).

COMPARATIVE EXAMPLE 1

A galvanized iron piece with untreated surface (50×100×1 mm) was used as a least specimen, and the time it took until zinc white rust was formed in a salt spray test (JIS Z 2371) was measured.

COMPARATIVE EXAMPLE 2

A galvanized iron piece (50×100×1 mm) was coated with a film by immersion for one minute in a commercially available trivalent chromate treating solution ("Aidip Z-348" of Aiko Chemical Co.), water washed and dried as a lest specimen.

Its appearance was visually evaluated, and its corrosion resistance was determined by measuring the time it took for the formation of zinc white rust in a salt spray test (JIS Z 2371).

COMPARATIVE EXAMPLE 3

A galvanized iron piece (50×100×1 mm) was conditioned on the surface with "Preparen Z" (of Nibon Parkerizing Co.) and was coated with a film by immersion for 15 seconds in a commercially available phosphate film treating solution ("Parbond 3300" of Nihon Parkerizing Co.) heated at 70° C. The coated piece was aftertreated with "Parlen 1" (of Nihon Parkerizing Co.) and dried as a test specimen.

Its appearance was visually inspected and the time it took for zinc white rusting-in a salt spray test (JIS Z 2371) was measured.

COMPARATIVE EXAMPLE 4

The same test specimen as used in Example 9 was immersed in an organic coating agent "5G018" (of Nihon Hyomen Kagaku) to serve as a test specimen.

Its appearance was visually examined and its corrosion resistance was evaluated in terms of the time required for the starting of zinc white rusting in a salt spray test (JIS Z 2371).

COMPARATIVE EXAMPLE 5

The same test specimen as used in Example 9 was immersed in an aqueous solution of a water-soluble resin "Cymel UFR" (of Mitsui Cytec) to provide a test specimen.

Its appearance was visually evaluated and, as for its corrosion resistance, the time required for zinc white rusting in a salt spray test (JIS Z 2371) was measured.

COMPARATIVE EXAMPLE 6

The same test specimen as used in Example 10 was immersed in an aqueous solution of a water-soluble resin "Cymel UFR" (of Mitsui Cytec) to serve as a test specimen.

Its appearance was visually evaluated and its corrosion resistance was determined by measuring the time required for zinc white rusting in a salt spray test (JIS Z 2371).

COMPARATIVE EXAMPLE 7

An iron piece coated with zinc containing 3500 ppm iron (50×100×1 mm) was treated with an aqueous solution of pH 1.2 which contained 30 g chromium phosphate and 20 g phosphoric acid, both per liter, for two minutes to form a coating film. The coated piece was water washed and dried as a test specimen.

Its appearance was visually examined and its corrosion resistance was determined in terms of the time required for zinc while rusting in a salt spray test (JIS Z 2371).

COMPARATIVE EXAMPLE 8

An iron piece coated with zinc containing 6500 ppm ion (50×100×1 mm) was coated with a film by treatment for two minutes with an aqueous solution of pH 1.2 which contained 25 g chromium acetate and 15 g phosphoric acid, both per liter. The coated piece was water washed and immersed in an aqueous solution containing 10% sodium silicate at 30° C. for 70 seconds to provide a test specimen.

Its appearance was visually inspected and its corrosion resistance was determined as the time required for zinc while rusting in a salt spray test (JIS Z 2371).

The evaluation results of the foregoing examples weft as follows.

TABLE 1

| Example | Appearance | Corrosion resistance |
|---|---|---|
| Ex | | |
| 1 | Uniform & bright | No zinc white rust in 120 hours |
| 2 | Uniform & bright | No zinc white rust in 120 hours |
| 3 | Uniform & bright | No zinc white rust in 120 hours |
| 4 | Uniform & bright | No zinc white rust in 120 hours |
| 5 | Uniform & bright | No zinc white rust in 120 hours |
| 6 | Uniform & bright | No zinc white rust in 120 hours |
| 7 | Uniform & bright | No zinc white rust in 120 hours |
| 8 | Uniform & bright | No zinc white rust in 120 hours |
| 9 | Uniform & bright | 5% zinc white rust in 72 hours |
| 10 | Uniform & bright | No zinc white rust in 120 hours |
| 11 | Uniform & bright | No zinc white rust in 120 hours |
| 12 | Uniform & bright | No zinc white rust in 120 hours |
| 13 | Uniform & bright | No zinc white rust in 600 hours |
| Comp | | |
| 1 | — | Entire zinc white rust within 1 hour |
| 2 | Uniform & bright | Zinc white rust within 24 hours |
| 3 | Gray~Grayish white | Zinc white rust within 24 hours |
| 4 | Not uniform | Zinc white rust within 24 hours |
| 5 | — | Zinc white rust within 12 hours |
| 6 | — | Zinc white rust within 12 hours |
| 7 | Not uniform | Zinc white rust within 24 hours |
| 8 | Not uniform | Zinc white rust within 60 hours |

As can be seen from Table 1, the surfaces treated with the treating solutions according to the present invention exhibited excellent corrosion resistance and uniform brightness.

In forming a protective coating film on the surface of Zn, Ni, Cu, Ag, Fe, Cd, Al, Mg, or their alloy, the present invention permits the formation of a film which combines uniform, good appearance with corrosion resistance, without using any noxious hexavalent chromium or highly corrosive fluorine compound. In particular, the invention makes it possible to form protective films on galvanized iron articles other than steels, which have hitherto been practically difficult to protect by a coating type treatment on an industrial scale.

What is claimed is:

1. A protectively coated metal substrate of Cu, Ag, Fe, Cd, Al, Mg, and alloy thereof, Zn, Ni, or Zn-Fe alloy, wherein the metal substrate is coated with a protective film which is a reaction product on the metal substrate of a solution substantially free of fluoride ions and containing (i) a source of metallic cations of at least one metal element selected from the group consisting of Mo, W, V, Ta, Ti, Zr, Ce, Sr and trivalent chromium, (ii) at least one oxyacid of phosphorus, oxyacid salt of phosphorus, or anhydride of an oxyacid of phosphorus, said oxyacid being selected from the group consisting of orthophosphoric acid, hypophosphorous acid, pyrophoshorous acid, tripolyphosphoric acid and perphosphoric acid, and (iii) at least one oxidizing substance selected from the group consisting of peroxide, [hydrochloric]*chloric* acid, [hydrobromic]*bromic* acid, nitric acid, and salts thereof.

2. The protectively coated metal substrate of claim 1, wherein the protective film is overcoated with an organic, inorganic, or composite corrosion-preventive coating film.

3. The protectively coated metal substrate of claim 1, wherein said solution further contains at least one substance selected from the group consisting of alkaline earth metals, an inorganic colloid, and silane coupling agents.

4. The protectively coated metal substrate of claim 2, wherein the inorganic colloid is selected from the group consisting of silica sol, alumina sol, titania sol, and zirconia sol.

5. The protectively coated metal substrate of claim 1, wherein said solution is substantially free of hexavalent chromium ions.

6. A protectively coated metal substrate of Zn, Ni, Cu, Ag, Fe, Cd, Al, Mg, or an alloy thereof, wherein the metal substrate is coated with a protective film which is a reaction product on the metal substrate of a solution substantially free of fluoride ions and containing (i) a source of metallic cations of at least one metal element selected from the group consisting of Mo, W, V, Ta, Ti, Zr, Ce, Sr and trivalent chromium, (ii) at least one oxyacid of phosphorus, oxyacid salt of phosphorus, or anhydride of an oxyacid of phosphorus, said oxyacid being selected from the group consisting of orthophosphoric acid, hypophosphorous acid, pyrophoshorous acid, tripolyphosphoric acid and perphosphoric acid, (iii) at least one oxidizing substance selected from the group consisting of peroxide, [hydrochloric]*chloric* acid, [hydrobromic]*bromic* acid, nitric acid, and salts thereof; and (iv) at least one substance selected from the group consisting of alkaline earth metals, an inorganic colloid, and silane coupling agents.

* * * * *